United States Patent [19]
van Doorn

[11] Patent Number: 6,082,353
[45] Date of Patent: Jul. 4, 2000

[54] SOLAR PANEL AND METHOD OF MANUFACTURING THEREOF

[76] Inventor: Andrew van Doorn, 480 St-Hubert, Granby, Quebec, Canada, J2G 5P4

[21] Appl. No.: 08/953,614

[22] Filed: Oct. 17, 1997

Related U.S. Application Data
[60] Provisional application No. 60/028,662, Oct. 18, 1996.

[51] Int. Cl.$^7$ ................... F24J 2/24; F28D 7/10; B21D 53/02
[52] U.S. Cl. ................ 126/659; 126/660; 126/661; 165/154; 165/171; 29/890.036; 29/890.043; 29/890.033
[58] Field of Search .................. 165/154, 171, 165/151; 29/890.036, 890.043, 890.033, 890.042; 126/271, 659, 660, 661

[56] References Cited

U.S. PATENT DOCUMENTS

| | | | |
|---|---|---|---|
| 2,263,714 | 4/1940 | Bloomfield et al. | 29/421.1 |
| 2,460,580 | 2/1949 | Huber | 29/421.1 |
| 4,023,557 | 5/1977 | Thorne et al. | 126/271 |
| 4,069,573 | 1/1978 | Rogers, Jr. et al. | 29/421 R |
| 4,083,093 | 4/1978 | Chertok | 29/157.3 V |
| 4,127,105 | 11/1978 | Watt | 126/271 |
| 4,170,221 | 10/1979 | Gavin | 126/446 |
| 4,182,013 | 1/1980 | Grossman | 29/157.3 V |
| 4,217,886 | 8/1980 | McLaughlin | 126/446 |
| 4,300,275 | 11/1981 | McLaughlin | 165/177 |
| 4,338,921 | 7/1982 | Harder et al. | 126/446 |
| 4,538,337 | 9/1985 | Holbrook et al. | 29/445 |
| 4,679,617 | 7/1987 | Keldmann | 165/171 |

*Primary Examiner*—Ira S. Lazarus
*Assistant Examiner*—David Lee
*Attorney, Agent, or Firm*—Quarles & Brady LLP

[57] ABSTRACT

A method for forming a solar collector includes a panel provided with an inner bore and a deformable metal tube inserted in the bore and mechanically secured thereto by passing a plug or bullet through the tube to deform it outwardly into intimate contact with the panel such as to maximize the heat transfer therebetween and to substantially eliminate any possibility of corrosion by keeping the tube in constant compression. The tube can carry a liquid, such as water or glycol, which is heated by the panel exposed to radiant solar heat. The so formed solar collector typically uses a copper tube and an extruded aluminum panel. A number of parallel conduits connected at their opposite ends to common main inlet and outlet copper pipes may be provided with the panels of adjacent conduits mating together while allowing for relative movement therebetween but without the forming of gaps therebetween.

14 Claims, 5 Drawing Sheets

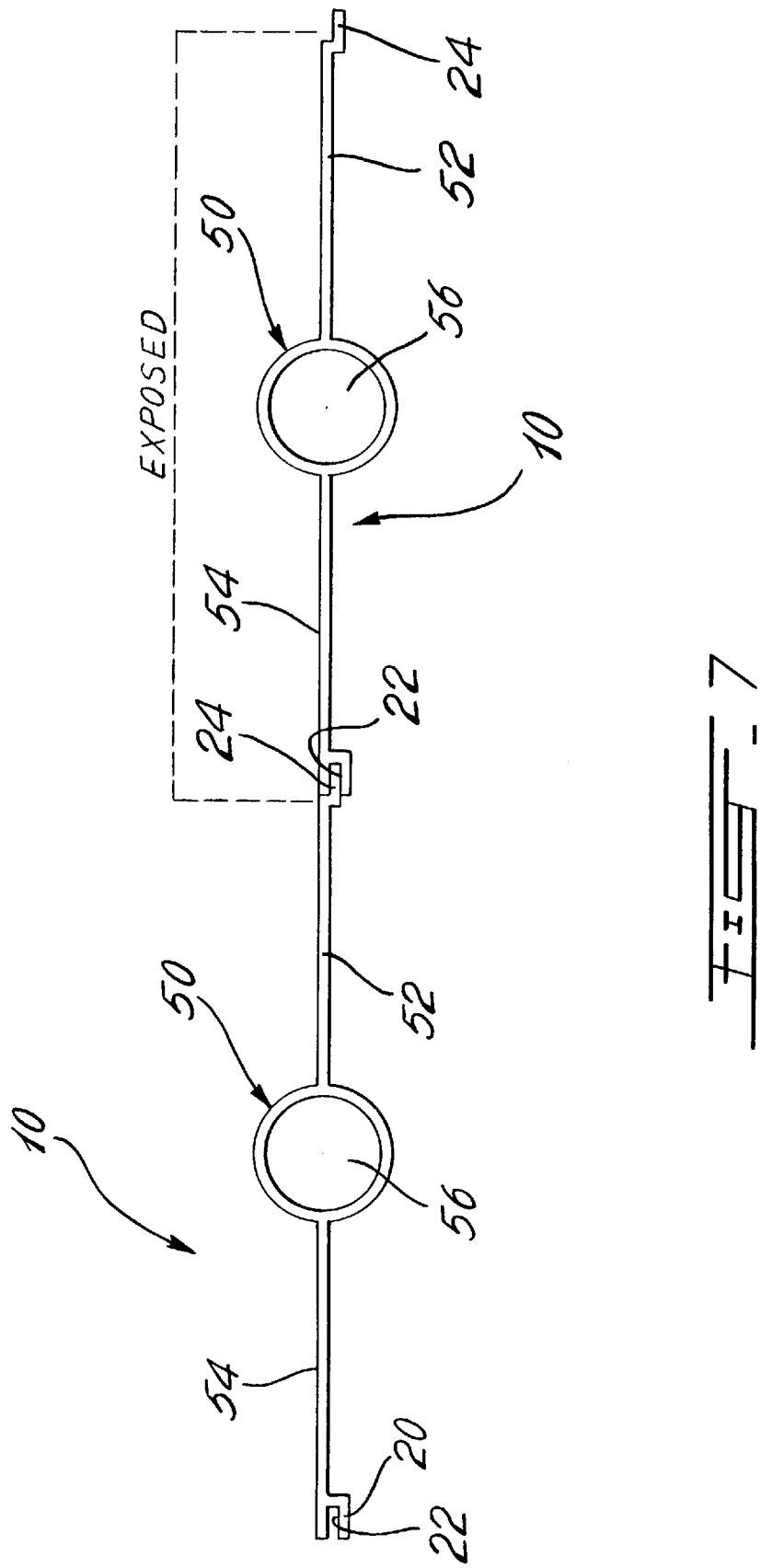

SOLAR PANEL AND METHOD OF MANUFACTURING THEREOF

CROSS-REFERENCE

This application claims priority on U.S. Provisional Application No. 60/028,662 filed on Oct. 18, 1996.

BACKGROUND OF THE INVENTION

1. Field of the Invention

The present invention relates to solar collectors, e.g. solar panels and, more particularly, relates to improvements in the solar collectors.

2. Description of the Prior Art

The use of solar collectors has gained acceptance in the industry as a means of gaining "free" energy for residential and industrial applications. In a residential application, the solar panels are frequently used to provide heat for hot water to be used in the residence and also for the purpose of heating swimming pools. Other uses have also been proposed.

In industrial applications, the solar panels are frequently used to provide heat input to water used in certain processes. In some instances, the heat input may be all that is required while in other situations additional heat would be provided by a second source.

A common type of collector for solar and other radiation, used for heating water comprises an absorber plate which absorbs the radiation and transfers the resulting heat to the water. The plate or plates are usually mounted in a unit which has insulation at the back of the plate and a glass cover to prevent loss of heat such as by winds and the like.

The absorber plate will normally have one or more conduits running therethrough and through which water or an other fluid is passed. It is a well known practice to use a surface coating on the plate to enhance the absorption of the radiation and to reduce thermal radiation which all heated bodies emit (This radiation being a function of a property of the surface called emissivity). In this respect, the coating of the surface of the absorber plate is a known art and these coatings are known as selective coatings that have the property of absorbing electromagnetic radiation in a certain wave length and have a low thermal emissivity.

Various materials and processes have been proposed for the manufacture of solar panels. As aforementioned, these panels require conduits extending therethrough and to this end various proposals have been advanced in the art.

When solar panels initially started to become popular, different combinations of materials were utilized. Copper was a material of choice in view of its conductivity and its well known capability to carry domestic water without releasing toxic substances in the water flowing therethrough and to carry glycol without being attacked thereby. Copper being expensive, aluminum, a relatively good and cheaper conductor, was considered as an alternative to copper, for instance. One popular structure used a copper conduit for carrying fluid which was embedded in a plate of aluminum. However, a number of problems arose including the problem of galvanic corrosion.

To overcome these problems, many proposals have been advanced including the use of roll bonding to ensure that there was no space between the aluminum and copper with a view to eliminating the galvanic corrosion. However, this created problems of its own in that one can only use a limited size of conduit and aluminum plating. As a result, when certain fluids such glycol (required in cold locations) were used, problems would occur as the glycol would tend to break down after a few years and clog the relatively small diameter conduits. Also, the limited thickness of the aluminum plate meant that the design of the solar collector could not be optimized for maximum heat retention and transfer.

U.S. Pat. No. 4,217,886 issued to Mclaughlin on Aug. 9, 1980 discloses a radiant energy collecting element where a tool inserted through a tube extending through a helically grooved cylindrical bore of an absorber plate causes the tube to be radially expanded such that the tube cold flows into the grooves defined in the bore of the absorber plate thereby locking the tube against displacement relative to the absorber plate.

SUMMARY OF THE INVENTION

It is therefore an aim of the present invention to provide an improved solar collector wherein the collector can be optimized for maximum heat retention.

It is also an aim of the present invention to provide a solar collector utilizing a copper material for conduits within an aluminum panel.

It is a further aim of the present invention to provide a method of manufacturing a solar collector by tightly securing a copper conduit within the sleeve of an aluminum heat collecting panel.

It is a still further aim of the present invention to provide a solar collector comprised of an aluminum panel having a sleeve and at least one fin integrally extending therefrom and a copper conduit tightly secured within the sleeve.

Therefore in accordance with the present invention, there is provided a method for forming a solar collector comprising the steps of providing panel means made of a conductive material and defining opening means therein, and conductive tube means; inserting said tube means in said opening means; passing plug means through said tube means such that said tube means is plastically outwardly deformed with said panel means being elastically deformed such that said panel means at said opening means exert constant pressure on said tube means in a tight and conductive assembly.

Also in accordance with the present invention, there is provided a solar collector comprising panel means made of a conductive material and defining opening means therein, and conductive tube means, said tube means being received in said opening means and being plastically deformed with said panel means being elastically deformed such that said panel means at said opening means exert constant pressure on said tube means in a tight and conductive assembly.

Further in accordance with the present invention, there is provided a method for forming a solar collector wherein a panel is provided with a channel into which is inserted a metal tube made of a material capable of being deformed. A plug is passed through the tube to deform it outwardly into intimate contact with the channel.

Further in accordance with the present invention, there is provided a solar collector utilizing a copper material for conduits within an aluminum panel, with a near perfect bond for maximum heat transfer and to substantially eliminate any possibility of galvanic corrosion by keeping the copper tube in constant compression, thus eliminating the possibility of water penetration into the assembly.

Further in accordance with the present invention, there is provided a solar collector fin which can easily be mass produced by ease of construction (no soldering and a one step process) and assembly. Typically, the aluminum panel is extruded and is mounted to the copper conduit. A number of parallel conduits connected at their opposite ends to common main inlet and outlet copper pipes may be provided with the panels of adjacent conduits mating together while allowing for relative movement therebetween.

BRIEF DESCRIPTION OF THE DRAWINGS

Having thus generally described the nature of the invention, reference will now be made to the accompanying drawings, showing by way of illustration a preferred embodiment thereof, and in which:

FIG. 7 is an end elevational view showing a pair of mating collector panels.

DESCRIPTION OF THE PREFERRED EMBODIMENTS

Figure 1:
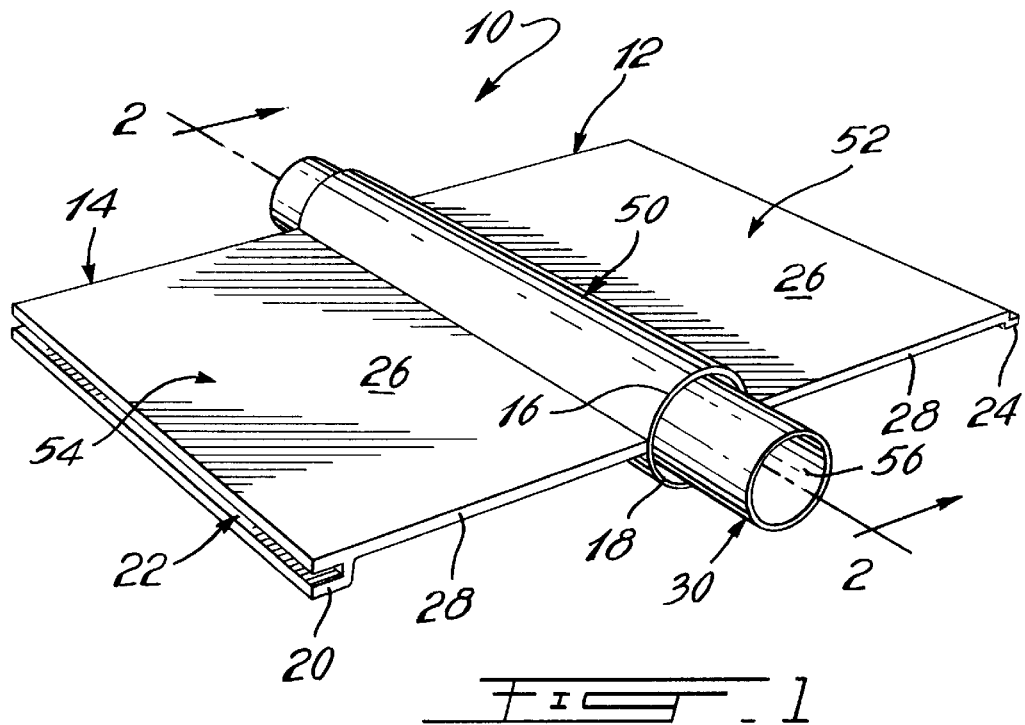
FIG. 1 is a perspective view of a collector panel according to an embodiment of the present invention.

In accordance with the present invention, a solar collector panel is generally designated by reference numeral 10 and includes two half portions which are generally designated by reference numerals 12 and 14. The solar collector panel 10 has an upper substantially planar surface 26 and a lower generally planar surface 28.

Intermediate the half portions 12 and 14, upper surface 26 is formed to have a semi spherical portion 16. Formed in registry with a semi spherical portion 16 is a second spherical portion 18 formed on bottom surface 28 intermediate half portions 12 and 14. Basically, the collector panel 10 which is made of aluminum and which can be conveniently manufactured by extrusion comprises a cylindrical sleeve 50 formed by semi-spherical portions 16 and 18 and a pair of fins 52 and 54 extending radially outwardly therefrom and respectively terminating with an L-shaped tongue 24 and a square yoke defining a slot 22.

Indeed, at the free marginal edge of the fin 54, there is provided the L-shaped extension 20 extending from surface 28 to define the slot 22 between the L-shaped extension 20 and the free end of the half portion 14.

The fin 52 also has at its free marginal edge a L-shaped portion or tongue 24 which is adapted to fit within slot 22 of an adjacent panel 10, as seen in FIG. 7.

The sleeve 50 (or both the semi spherical portions 16 and 18) defines a channel or cylindrical bore 56 adapted to receive therein a conduit or tube 30. The tube 30 is formed of a material capable of being deformed such as copper.

Figure 2:
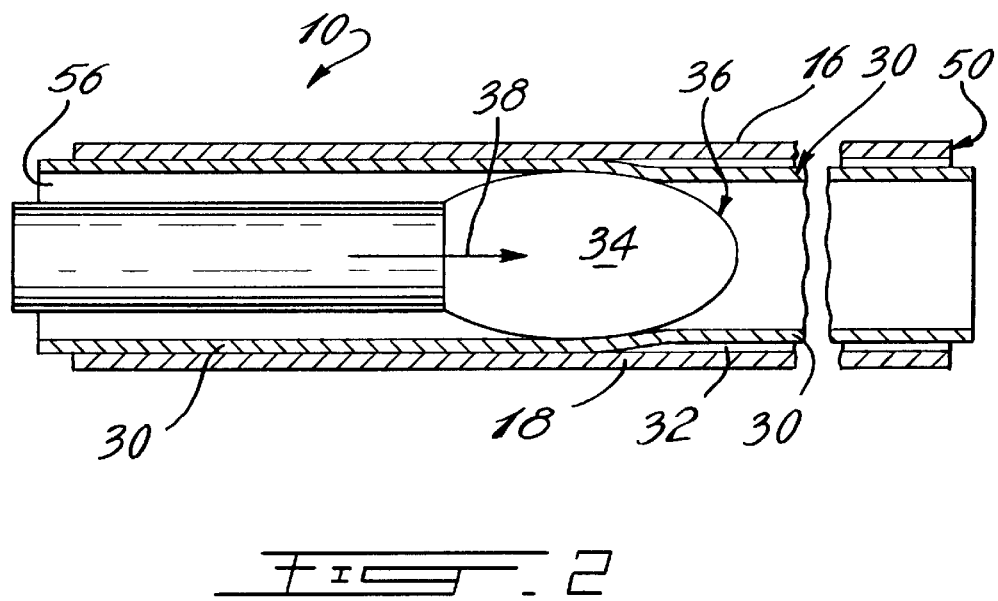
FIG. 2 is a longitudinal cross sectional view taken along the line 2—2 of FIG. 1 and showing a bullet being used to expand an inner conduit within an outer sleeve into a substantially gap-less, tight and secure assembly.

As may be best seen in FIG. 2 and on the right hand side thereof, the tube 30 is designed to have an outer diameter which is slightly smaller than the diameter of the bore 56 formed in the sleeve 50. Thus, there is provided a gap 32.

According to the practice of the present invention, a plug member 34 having a somewhat tapered front end 36 is passed through the tube 30 as indicated by arrow 38. The plug member 34 is sized to have a maximum diameter larger than the inside diameter of the tube 30 such that as it passes through the tube 30, the plug member 34 deforms tube 30 in that it radially expands the tube 30 such as to become in intimate contact with the inner side walls of the sleeve 50 or semi-spherical portions 16 and 18. In so doing, the tube 30 is pressed into intimate contact eliminating all air spaces between the tube 30 and the sleeve 50 of the collector panel 10 and thus any possibility of galvanic corrosion thereat. Furthermore, an excellent heat transfer due to the contact between the two metallic materials of the panel 10 and tube 30 will result as well as a secure assembly therebetween.

The sizing of plug member 34 is important It is sized such that the copper tube is expanded almost 0.020 of an inch on the diameter after insertion of the plug member 34 and the critical parameter resides in that the copper tube 30 must be deformed past its elastic limit and thus it must be plastically, i.e. permanently, deformed. Furthermore, the expansion of the tube 30 due to the plug member 34 must be such as to deform the aluminum sleeve 50 within its elastic range such that the sleeve 50 tends to "spring back" tightly against the deformed tube 30. As the tube 30 is plastically deformed and, by so doing, one avoids having the copper tube 30 spring back and pull away from the aluminum sleeve 50 and as the sleeve 50 is elastically deformed and thus tends to contract towards the tube 30, the assembly of the tube 30 in the sleeve 50 is in constant compression thereby ensuring a tight assembly, whereby the heat transfer between both components is maximized and corrosion therebetween is substantially eliminated.

For instance, extruded aluminum no. 6063 may be used as it is very rigid and thus, when expanded or stretched, retains its spring back.

With regards to linear expansion, copper and aluminum, when heated, deform differently although, with the present highly stressed assembly of the tube 30 and the sleeve 50, both materials follow each other in that they linearly deform together, i.e. at a level between that which the aluminum would deform if it was alone and that of the copper.

The aluminum of the collector member 10 is anodized to prevent corrosion and to form a selective surface, i.e. one that has the property of absorbing electromagnetic radiation in a certain range of thermal wave lengths and has a low thermal emissivity.

Figure 5:
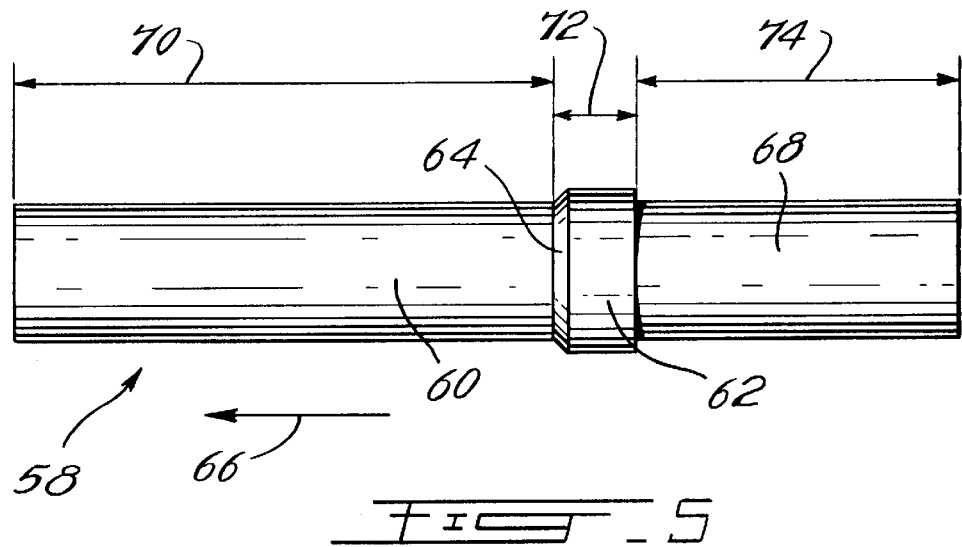
FIG. 5 is a schematic elevational view of an alternate bullet.

With reference to FIG. 5, there is illustrated a variant bullet 58 including a front section 60 of a diameter smaller than the inside diameter of the tube 30 (before deformation thereof) such as to be easily insertable in the tube 30. The bullet 58 also includes an enlarged middle section 62 which is larger than the inside diameter of the tube 30 and which is thus adapted to radially expand the tube when the bullet 58 is driven as per arrow 66 through the tube 30 itself previously positioned in the sleeve So. The enlarged section 62 defines a leading tapered shoulder 64 to facilitate the expansion of the tube 30 by the enlarged section 62. The diameter of the enlarged section 62 is obviously critical for a proper deformation of the copper tube 30 to be obtained. The bullet 58 also includes a trailing section 68 and defines an inner cylindrical bore 76 (see FIG. 6).

Figure 6:
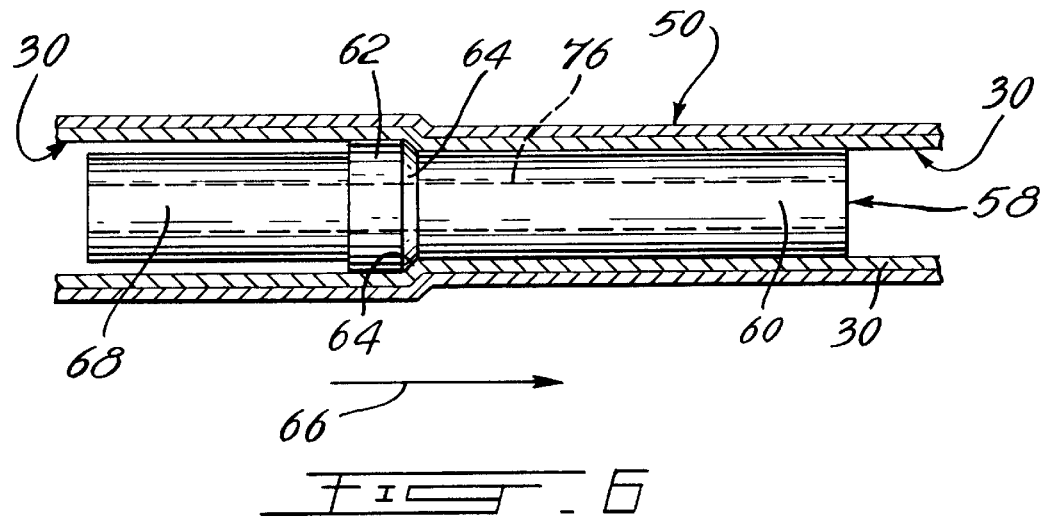
FIG. 6 is a schematic longitudinal cross sectional view similar to FIG. 2 but showing the bullet of FIG. 5 being used to expand the inner conduit within the outer sleeve.

FIG. 6 shows the bullet 58 being driven through the tube 30 during which the front section 60 acts as a guide for the bullet 58 within the sleeve 50. The bullet 5B may be made of high speed steel (HSS) with carbide for a high resistance to wear.

For example, for a bullet 58 having a front section 60, an enlarged section 62 and a trailing section 68 having diameters respectively of 0.562", 0.586" and 0.584"; for a tube 30 having undeformed inside and outside diameters respectively of 0.569" and 0.625" and a wall thickness of 0.028"; and for a sleeve 50 having undeformed inside and outside diameters respectively of 0.639" and 0.759", the assembly of the tube 30 and the sleeve 50 resulting from the bullet 58 will see the tube 30 having expanded inside and outside diameters respectively of 0.586" and 0.645" and the sleeve 50 having expanded inside and outside diameters respectively of 0.645" and 0.761–0.762".

The lengths 70, 72 and 74 respectively of the front, middle and trailing sections 60, 62 and 68 of the bullet 58 can, for instance, respectively be of 2.0", 0.25" and 1.25".

The length of the collector panel 10 (i.e. along the direction of its sleeve 50) can be of 90" (before anodizing) with a final length of 93".

Figure 3:
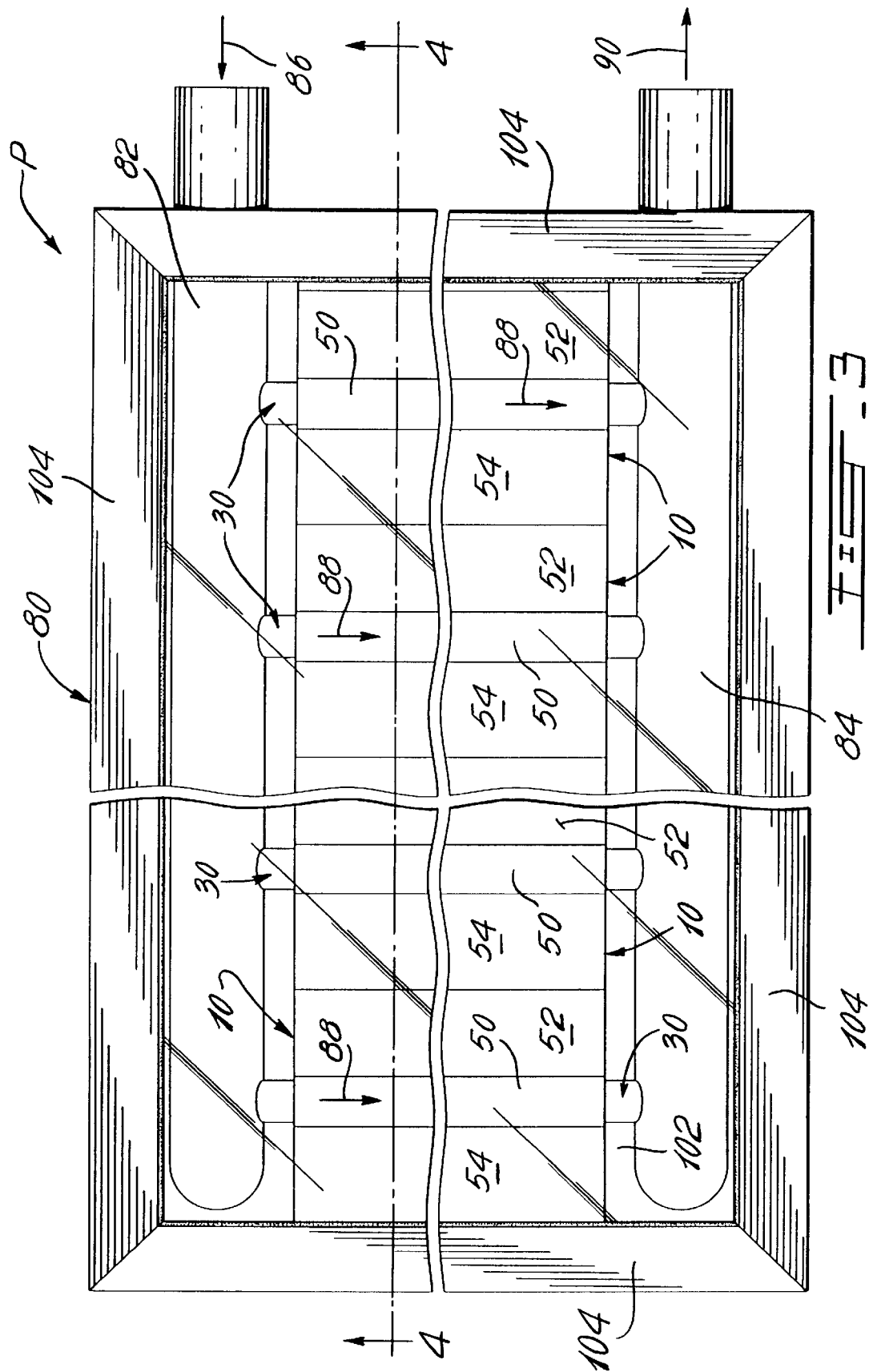
FIG. 3 is a schematic top plan view of a solar panel made of a number of collector panels of FIG. 1.

FIG. 3 shows a complete solar panel P including, within a frame 80 to be described hereinafter, a number of collector panels 10 provided with respective tubes 30 assembled thereto (as per the above method). The tubes 30 extend parallelly and have their opposite ends fluidly connected to anodized inlet and outlet—copper—pipes 82 and 84, respectively, such that water or glycol entering the solar panel P through the inlet pipe 82 as per arrow 86 will flow through the tubes 30 along arrows 88 where the fluid will be heated by radiation mainly by way of the fins 52 and 54 of the solar collectors 10. The heated fluid exiting frog the tubes 30 of the solar collectors 10 gathers in outlet pipe 84 and flows therein and out of the solar panel P along arrow 90.

Figure 4:
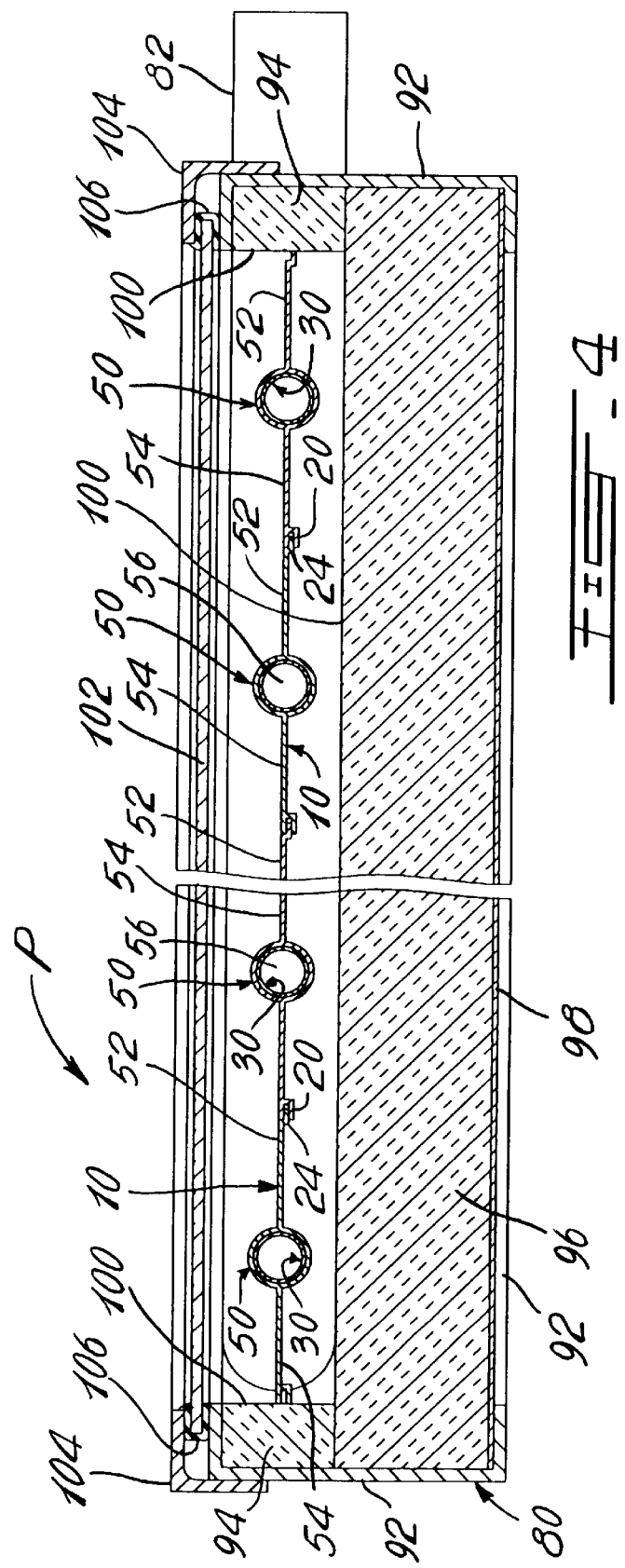
FIG. 4 is a cross sectional view taken along the line 4—4 of FIG. 3.

With reference to FIG. 4, the frame 80 of the solar panel P is mainly defined by anodized U-shaped channels 92 herein joined together in a rectangular frame shape. Closed cell material 94 runs peripherally around the solar collectors 10 and also thereunder at 96. An anodized sheet of metal 98 is mounted to the channels 92 and extends under the closed cell material 96. The inside surfaces 100 of the closed cell material 94 and 96 have an aluminized paper sheet adhered thereto. A hardened low iron glass (for maximal transmissibility and safety purposes) window 102 extends above the solar collectors 10 and is secured to the channels 92 with L-shaped brackets 104 with gaskets 106 extending on both sides of the edges of the window 102 sandwiched between the L-shaped brackets 104 and the frame channels 92.

As best seen in FIGS. 4 and 7, the solar collectors 10 of adjacent tubes 30 mate together with the loose engagement of the tongues 24 into the slots 22. This configuration provides a straight and easy assembly and allows for certain relative movements between the solar collectors 10 due to changes in heat without forming gaps between respective fins 52 and 54 of adjacent solar collectors 10.

It is noted that the bullet 58 is driven through the tube 30 as follows. A hydraulic piston having a diameter similar to (and typically slightly less than) that of the front section 60 of the bullet 58 is provided at its free end with a longitudinally extending threaded rod of a diameter less than the diameter of the bore 76 defined in the bullet 58. The piston is thus inserted through the tube 30 itself located in the sleeve 58 and the bullet 58 is slid over the threaded rod such that the front section 60 lies opposite the piston. A nut is threadably installed on the threaded rod behind the trailing section 68 of the bullet 58. The piston is then retracted thereby displacing the bullet 58 into and through the tube 30, the bullet 58, during this retraction of the bullet 58, being retained onto the threaded rod of the piston by the nut. The piston, as does the front section 60 of the bullet 58, acts as a guide for the bullet 58 during its forced displacement through the tube 30 thereby preventing a deflection of the bullet 58 away from a longitudinal axis of the tube 30.

It will be understood that the above described embodiment is for purposes of illustration only and that changes and modifications may be made thereto without departing from the spirit and scope of the invention.

I claim:

1. A method for forming a solar collector comprising the steps of providing a panel for receiving radiant energy made of a conductive material and defining an opening therein said opening having a first inside diameter, and a conductive tube having a first outside diameter; inserting said tube in said opening; passing an expander plug through said tube such that said tube is plastically outwardly deformed such as to adopt a second outside diameter larger than said first outside diameter and said tube is in an expanded position with said panel being elastically deformed such that said opening adopts a second inside diameter larger than said first inside diameter wherein said opening is retained with an inside diameter larger than said first inside diameter by said tube in said expanded position, whereby said panel at said opening exerts constant pressure on said tube in a tight and conductive assembly.

2. A solar collector comprising a panel for receiving radiant energy made of a conductive material and defining an opening therein, and a conductive tube, said tube being received in said opening, said tube being plastically deformed and having an outside diameter greater than that at a previous position thereof prior to assembly to said panel with said panel being elastically deformed and having an inside diameter greater than that at a previous position thereof prior to assembly to said tube, whereby said panel at said opening exerts constant pressure on said tube in a tight and conductive assembly.

3. A method as defined in claim 1, wherein said tube is made of copper and said panel is made of aluminum.

4. A method as defined in claim 1, wherein said panel comprises a cylindrical sleeve and first and second fins extending coplanarly on diametrically opposed sides of said sleeve.

5. A method as defined in claim 4, wherein said first and second fins are provided with complementary engagement members for allowing side-by-side engagement of more than one of said panel.

6. A method as defined in claim 5, wherein said engagement members comprise a tongue and a slot provided respectively on outer longitudinal edges of said first and second fins.

7. A method as defined in claim 6, wherein said tongue and said slot are offset from a main plane of said panel, whereby fins of two panels engaged at said outer longitudinal edges thereof define a substantially uninterrupted surface.

8. A method as defined in claim 7, wherein said tube is made of copper and said panel is made of aluminum.

9. A solar collector as defined in claim 2, wherein said tube is made of copper and said panel is made of aluminum.

10. A solar collector as defined in claim 2, wherein said panel comprises a cylindrical sleeve and first and second fins extending coplanarly on diametrically opposed sides of said sleeve.

11. A solar collector as defined in claim 10, wherein said first and second fins are provided with complementary engagement members for allowing side-by-side engagement of more than one of said panel.

12. A solar collector as defined in claim 11, wherein said engagement members comprise a tongue and a slot provided respectively on outer longitudinal edges of said first and second fins.

13. A solar collector as defined in claim 12, wherein said tongue and said slot are offset from a main plane of said panel, whereby fins of two panels engaged at said outer longitudinal edges thereof define a substantially uninterrupted surface.

14. A solar collector as defined in claim 13, wherein said tube is made of copper and said panel is made of aluminum.

* * * * *